US010852763B2

(12) United States Patent
Azam et al.

(10) Patent No.: US 10,852,763 B2
(45) Date of Patent: *Dec. 1, 2020

(54) CURVED MODULAR DISPLAY

(71) Applicant: HEWLETT-PACKARD DEVELOPMENT COMPANY, L.P., Spring, TX (US)

(72) Inventors: Syed S. Azam, Spring, TX (US); Humberto Fossati, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,903

(22) Filed: Aug. 28, 2019

(65) Prior Publication Data

US 2019/0384353 A1    Dec. 19, 2019

Related U.S. Application Data

(63) Continuation of application No. 16/077,370, filed as application No. PCT/US2017/014813 on Jan. 25, 2017, now Pat. No. 10,429,883.

(51) Int. Cl.
| | | |
|---|---|---|
| *G06F 1/16* | (2006.01) | |
| *G06F 9/00* | (2006.01) | |
| *G06F 15/76* | (2006.01) | |
| *G06F 1/18* | (2006.01) | |

(52) U.S. Cl.
CPC ............ *G06F 1/1601* (2013.01); *G06F 1/182* (2013.01); *G06F 9/00* (2013.01); *G06F 15/76* (2013.01); *G06F 2200/1612* (2013.01)

(58) Field of Classification Search
CPC ..... G06F 1/1601; G06F 1/1647; G06F 1/1654
USPC .......................... 361/679.04, 679.22, 679.23
See application file for complete search history.

(56) References Cited

U.S. PATENT DOCUMENTS

| | | | |
|---|---|---|---|
| 5,675,687 A | 10/1997 | Wood | |
| 5,914,698 A * | 6/1999 | Nicholson | ............... G06F 3/147 340/908.1 |
| 6,212,068 B1 | 4/2001 | Rooyakkers | |
| 6,222,507 B1 | 4/2001 | Gouko | |
| 6,690,337 B1 * | 2/2004 | Mayer, III | ............ G06F 1/1601 345/1.1 |
| 7,145,767 B2 | 12/2006 | Mache | |
| 8,102,331 B1 | 1/2012 | Moscovitch | |
| 8,648,774 B2 | 2/2014 | Kline et al. | |
| 8,804,349 B2 | 8/2014 | Lee et al. | |
| 8,922,457 B2 | 12/2014 | Moscovitch | |
| 9,146,400 B1 | 9/2015 | Lee et al. | |
| 9,261,724 B2 * | 2/2016 | Zhang | ................. G02F 1/13336 |

(Continued)

*Primary Examiner* — Anthony Q Edwards
(74) *Attorney, Agent, or Firm* — Tong Rea Bentley & Kim LLC

(57) ABSTRACT

In example implementations, a modular display system is provided. The modular display system includes a center modular display and a curved modular display. The center modular display is bezel free on a left side and a right side. The curved modular display includes a single bezel free side and a display area that is less than, or equal to, a display area of the center modular display. The single bezel free side of the curved modular display is in communication with the left side, or the right side, of the center modular display such that the center modular display and the curved modular display appear as a single display to a computing device.

22 Claims, 6 Drawing Sheets

(56) References Cited

U.S. PATENT DOCUMENTS

| | | | |
|---|---|---|---|
| 9,299,314 B2 | 3/2016 | Lee et al. | |
| 9,342,105 B2 | 5/2016 | Choi et al. | |
| 9,998,706 B2 | 6/2018 | Ijams | |
| 10,082,694 B2 * | 9/2018 | Choi | G02F 1/13336 |
| 10,429,883 B2 * | 10/2019 | Azam | G06F 1/1637 |
| 2006/0061946 A1 * | 3/2006 | Vick | G06F 1/1601 |
| | | | 361/679.04 |
| 2006/0114236 A1 | 6/2006 | Ray | |
| 2014/0375530 A1 | 12/2014 | Delaporte | |
| 2015/0189768 A1 | 7/2015 | Kishida et al. | |
| 2016/0284497 A1 | 9/2016 | Stryker | |
| 2018/0108330 A1 | 4/2018 | Wallace | |

* cited by examiner

CURVED MODULAR DISPLAY

CROSS-REFERENCE TO RELATED APPLICATIONS

This application is a continuation of U.S. patent application Ser. No. 16/077,370, filed on Aug. 10, 2018, which is a 371 (c) National Phase Application of International Application No. PCT/2017/014813, filed Jan. 25, 2017, both of which are herein incorporated by reference in their entireties.

BACKGROUND

Monitors are used to display video, graphics and documents. As productivity increases, more users are demanding larger display areas on the monitors to view more documents, images and information simultaneously. To accommodate these demands, monitors have grown in size over the years to provide more display area to the user. Alternatively, some users may set up multiple flat screen monitors side by side to provide a larger display area.

In addition, widescreen monitors and ultra-wide screen monitors have grown in popularity and demand to provide additional display area. As the screen size grows, the larger monitors and widescreen monitors may be curved to allow more of the screen to be viewed by a user.

DETAILED DESCRIPTION

The present disclosure discloses a modular display system. As discussed above, monitors have grown in screen size to provide a larger viewing area and increase user productivity. To allow more of the screen to be seen, the larger monitors are curved to allow the user to use his or her peripheral vision. A single curved monitor has a fixed amount of curvature that is limited by the size of the single substrate used to make the monitor. In addition, a single curved monitor has fixed curve on both sides of the monitor. It may also be difficult to combine two curved monitors to increase the viewing area if a user prefers to have a side-by-side monitor configuration.

The examples of the present disclosure provide a modular display system that allows for more flexibility in user configurations. For example a center modular display may be flat and a curved modular display may be coupled to one or both sides of the center modular display. The center modular display and the curved modular display may operate as stand-alone monitors or may be combined to appear as a single larger monitor. The curved modular display may be coupled to the center modular display to allow for additional center modular displays to be added. As a result, the modular display system of the present disclosure provides more flexibility to allow the user to customize the size of the display area and the amount of curvature on one end or both ends of the modular display system.

In addition, a single curved modular display part may be used for both ends of the modular display system. As a result, a single part with a single stock keeping unit (SKU) number can be used for both a left side and a right side of the modular display system. The single curved modular display can be rotated 180 degrees. In additional implementations, different curved modular displays having different amounts of curvature can be used to allow the user to customize the modular display system with a desired amount of curvature.

The examples of the present disclosure also provide a method for re-assigning functions of buttons (e.g., physical bezel buttons or virtual touch buttons) on the curved modular display. For example, order or sequence of functions of the bezel buttons can be maintained the same for both the left side and the right side even after the curved modular display is rotated 180 degrees and placed on opposite sides as another curved modular display.

Figure 1:
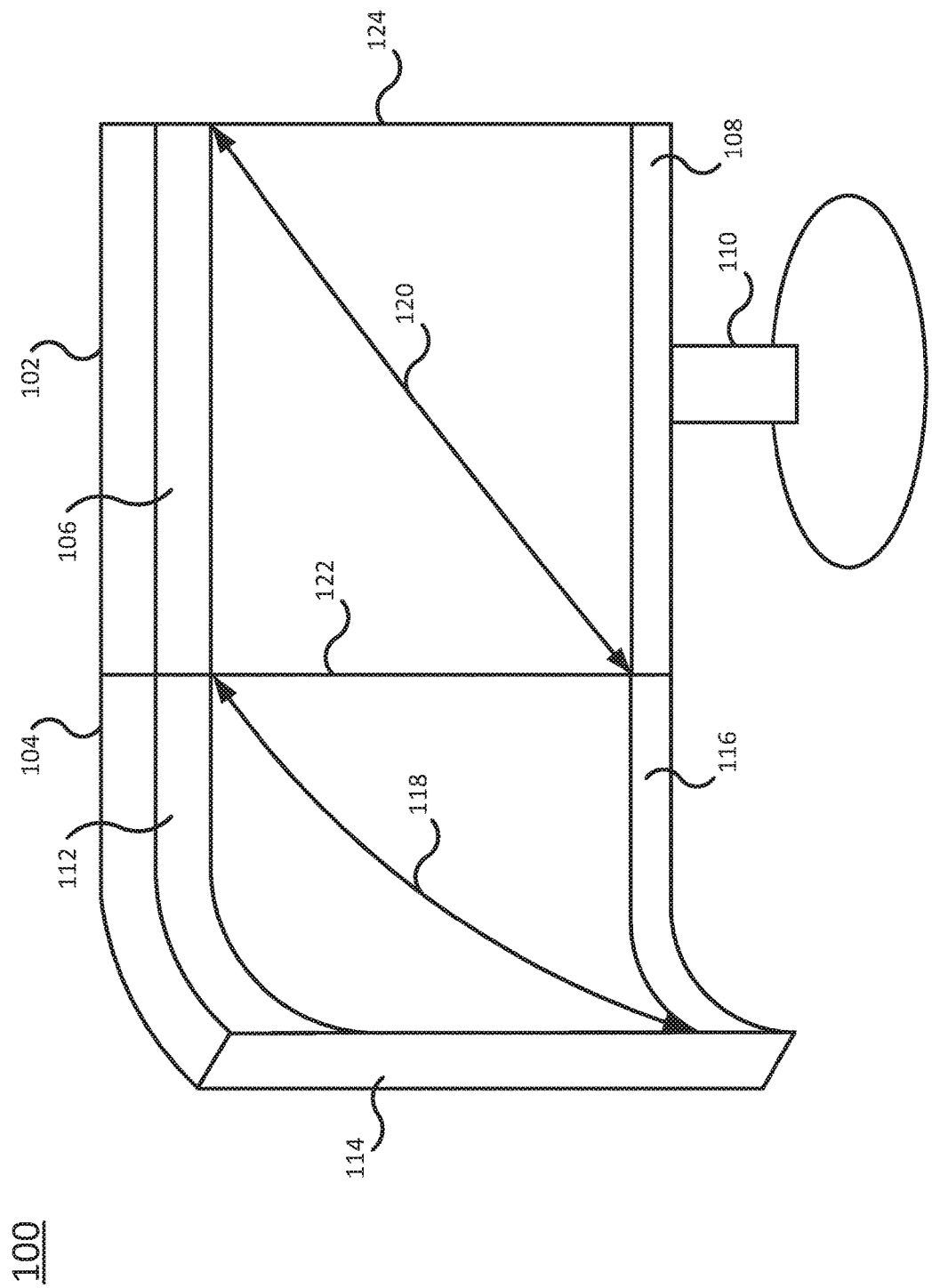
FIG. 1 is a perspective view of an example modular display system of the present disclosure.

FIG. 1 illustrates a block diagram of an example modular display system 100 of the present disclosure. In one implementation, the modular display system 100 includes a center modular display 102 and at least one curved modular display 104.

The center modular display 102 and the curved modular display 104 are "modular" in that they are removably coupled to one another. In other words, the center modular display 102 and the curved modular display 104 are "modular" in that they may operate separately as independent monitors or be coupled together to form a single display of the modular display system 100. Said another way, the center modular display 102 and the curved modular display 104 are not separate display areas within a single substrate or single display. Rather, the center modular display 102 and the curved modular display 104 are independent devices that can be combined or physically separated. In other words, the center modular display 102 and the curved modular display 104 are manufactured separately from two separate substrates to form the respective displays.

In one example, the center modular display 102 includes a bezel on a top side 106 and a bottom side 108. The center modular display 102 is bezel free on a left side 122 and a right side 124. In other words, the screen or viewing area of the center modular display 102 may span from an edge of the left side 122 to an edge of the right side 124. The center modular display 102 may be held or mounted to a stand 110.

In one example, the curved modular display 104 may include a single bezel free side. For example, the curved modular display 104 may include a bezel on a top side 112, a bottom side 116 and a single side 114. A display area 118 of the curved modular display 104 may be less than or equal to a display area 120 of the center modular display 102. The smaller display area 118 allows the curved modular display 104 to have more curvature than would be possible with a single substrate used to form a curved display.

In one example, the bezel free side of the curved modular display 104 may be in communication with the left side 122, or the right side 124, of the center modular display 102. In other words, a single curved modular display 104 may be used for both sides of the modular display system 100. As a result, a single stock keeping unit (SKU) number may be used for the curved modular display 104, which may keep production costs and inventory costs lower.

For example, FIG. 1 illustrates the bezel free side of the curved modular display 104 in communication with the left side 122 of the center modular display 102. Notably, no bezel exists between the center modular display 102 and the curved modular display 104. As a result, the display area 118 and the display area 120 appear as a single continuous screen that is part of the modular display system 100.

In one example, the curved modular display 104 may be in communication with the left side 122 of the center modular display 102 via an electrical connection or via a wireless connection. In other words, the curved modular display 104 and the center modular display 102 may exchange data (e.g., video data) via a physical electrical connection or a wireless connection (e.g., Bluetooth®, WiFi, infrared, and the like).

Figure 2:
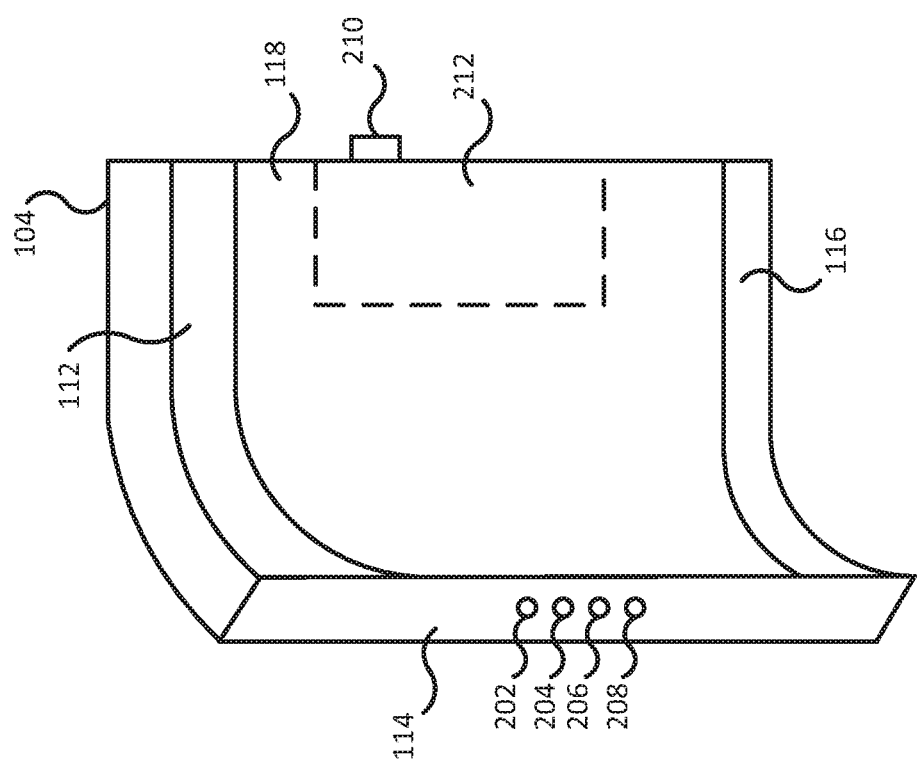
FIG. 2 is a block diagram of an example curved modular display.

FIG. 2 illustrates an example block diagram of the curved modular display 104. The curved module display may include a plurality of reconfigurable buttons 202, 204, 206 and 208. In one implementation, the plurality of reconfigurable buttons may be physical buttons or may be virtual buttons (e.g., touch areas on the bezel 114, touch areas in the display area 118, etc.). The reconfigurable buttons 202, 204, 206 and 208 may be located approximately at a center of the bezel 114. Although four reconfigurable buttons 202, 204, 206 and 208 are illustrated in FIG. 2, it should be noted that any number of reconfigurable buttons may be deployed. In addition, the bezel buttons may include a joystick or rotatable button.

As noted above, the display area 118 may be rotated 180 degrees. As a result, the curved modular display 104 may be located on a left side 122 or a right side 124 of the center modular display 102. By locating the reconfigurable buttons 202, 204, 206 and 208 approximately at the center of the bezel 114, the reconfigurable buttons 202, 204, 206 and 208 may appear symmetrical on both sides when two curved modular displays 104 are coupled to the left side 122 and the right side 124 of the center modular display 102.

In one example, the reconfigurable buttons 202, 204, 206 and 208 may each perform a different function and be automatically reconfigurable. In other words, when the display area 118 is rotated 180 degrees and located on the right side 124, the order of the reconfigurable buttons 202, 204, 206 and 208 would also flip 180 degrees. Thus, the reconfigurable button 208 would be on top and the reconfigurable button 202 would be on the bottom. The user may be used to a certain sequence of functions for the reconfigurable buttons 202, 204, 206 and 208. If the reconfigurable buttons 202, 204, 206 and 208 were not reconfigurable, the user may become confused as to which reconfigurable buttons 202, 204, 206 and 208 perform which functions when the curved modular display 104 is rotated 180 degrees.

To illustrate, the reconfigurable button 202 may be a power button, the reconfigurable button 204 may be a menu button, the reconfigurable button 206 may be an up navigation button and the reconfigurable button 208 may be a down navigation button. When the curved modular display 104 is rotated 180 degrees and connected to the right side 124 of the center modular display 102, the reconfigurable buttons 202, 204, 206 and 208 may automatically be reconfigured to perform a function in accordance with a desired sequence of functions. For example, the reconfigurable button 208 that is now on top may be reconfigured to be the power button. The reconfigurable button 206 that is now second from the top may be reconfigured to be the menu button. The reconfigurable button 204 that is now second from the bottom may be reconfigured to be the up navigation button. The reconfigurable button 202 that is now the bottom button may be reconfigured to be the down navigation button. Thus, the reconfigurable buttons 202, 204, 206 and 208 may be automatically reconfigured to maintain a sequence of desired functions when the curved modular display 104 is rotated 180 degrees.

Figure 5:
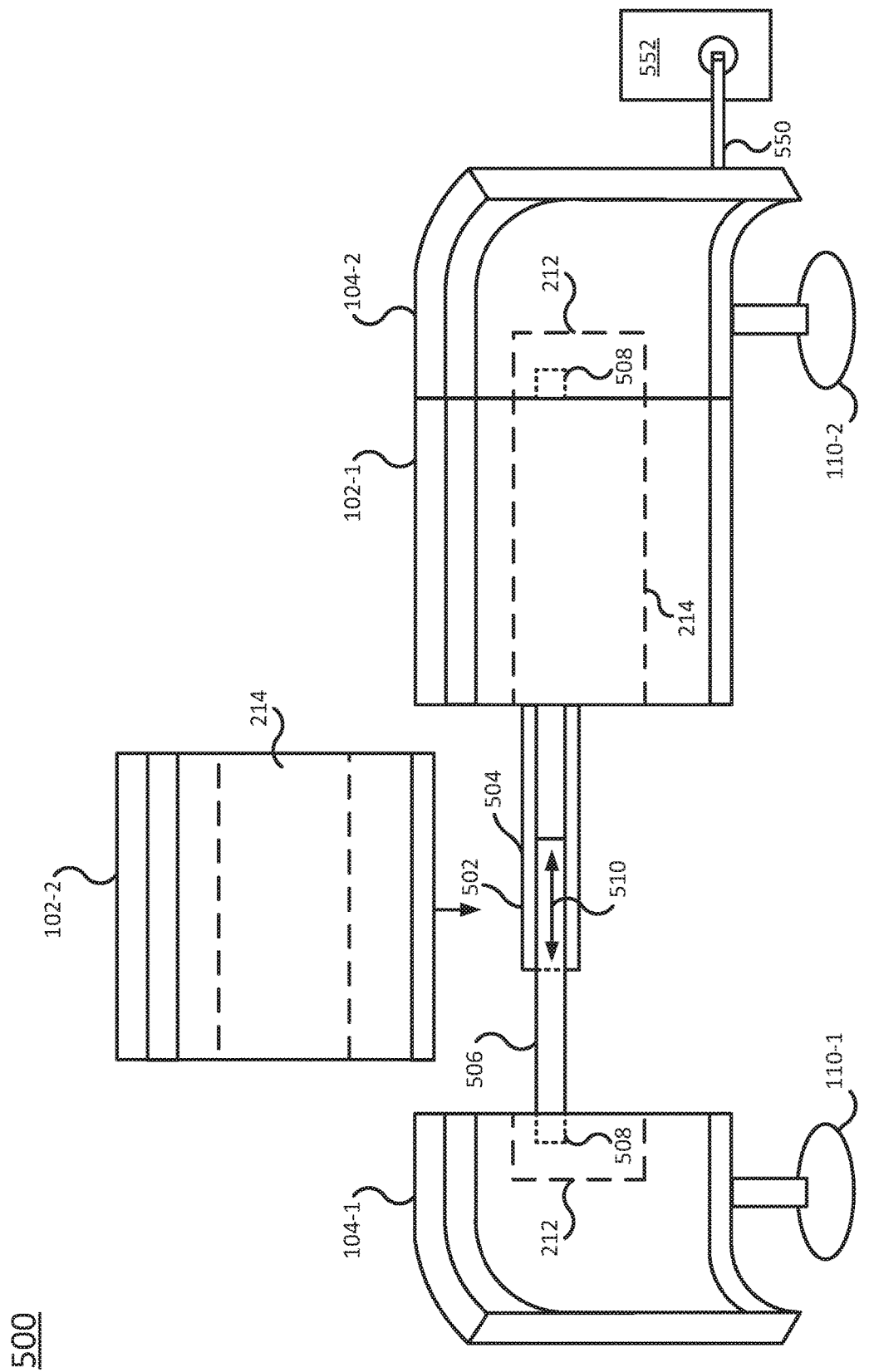
FIG. 5 is a block diagram of an example connection mechanism of the modular display system.

The curved modular display 104 may also include an electrical connector 210. The electrical connector 210 may be a universal serial bus (USB) connection that provides a transfer of power and data between the curved modular display 104 and the center modular display 102. As a result, when the curved modular display 104 is part of the modular display system 100 the curved modular display 104 may draw power from the center modular display 102 (as shown in FIG. 3 and discussed below) or may draw power directly from a power outlet and provide power to the center modular display 102 (as shown in FIG. 5 and discussed below).

The curved modular display 104 may include a physical connector 212 shown in phantom lines behind the display area 118. For example, the physical connector 212 may be coupled to, or formed as part of, a back side of a housing of the curved modular display 104. The physical connector 212 may be a mechanical connector that mates with a corresponding physical connector on the center modular display 102 such as an interference fit, a snap fit, a fastener (e.g., a screw, a bolt, and the like), ora spring clamp. In another example, the physical connector 212 may mate with another mounting apparatus (e.g., as illustrated in FIG. 5 and discussed below).

Thus, the curved modular display 104 may not use a stand when physically connected to the center modular display 102 as shown in FIG. 1. However, when the curved modular display 104 is operated as a separate monitor, the curved modular display 104 may also be mounted to a respective stand.

Figure 3:
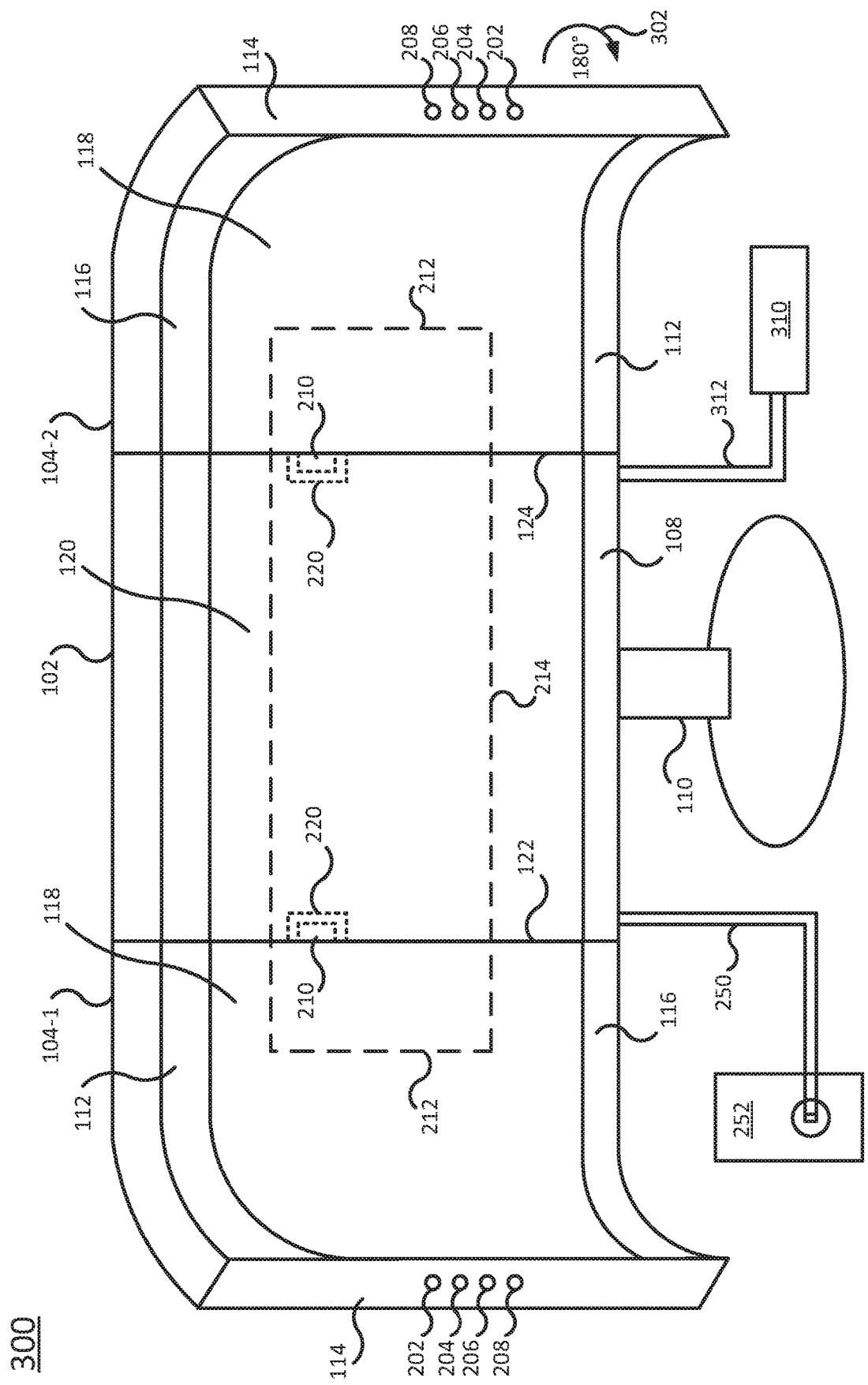
FIG. 3 is a block diagram of a front view of an example modular display system of the present disclosure.

FIG. 3 illustrates a block diagram of a front view of an example modular display system 300. The modular display system 300 illustrates a first curved modular display 104-1 in communication with the left side 122 and a second curved modular display 104-2 in communication with the right side 124 of the center modular display 102.

As noted above, the center modular display 102 is bezel free on the left side 122 and the right side 124. The first curved modular display 104-1 and the second curved modular display 104-2 each have a single bezel free side that is in communication with the bezel free left side 122 and the bezel free right side 124, respectively, of the center modular display 102.

Notably, the second curved modular display 104-2 is the same as the first curved modular display 104-1, but rotated 180 degrees around an axis that goes into the page (as shown by an arrow 302). Said another way, the first curved modular display 104-1 and the second curved modular display 104-2 share the same SKU number as discussed above. The rotation can also be shown by the reconfigurable buttons 202, 204, 206 and 208. For example, the order, or sequence, of the reconfigurable buttons 202, 204, 206 and 208 is flipped on the second curved modular display 104-2 relative to the first curved modular display 104-1. The reconfigurable buttons 202, 204, 206 and 208 on the first curved modular display 104-1 and the second curved modular display 104-2 may perform identical functions, but assigned to different buttons depending on which curved modular display 104-1 or 104-2 has the active reconfigurable buttons 202, 204 206 and 208. In another example discussed below, the reconfigurable buttons 202, 204, 206 and 208 on both curved modular displays 104-1 and 104-2 may be active and assigned different functions. It should also be noted that the reconfigurable buttons 202, 204, 206 and 208 are positioned on the bezel 114 such that the reconfigurable buttons 202, 204, 206 and 208 appear to be mirror images of each other despite the rotation.

In one implementation, the user may pre-define which side's reconfigurable buttons 202, 204, 206 and 208 will be active in the modular display system 300. For example, the user may prefer having active buttons on the right side. As a result, the reconfigurable buttons 202, 204, 206 and 208 of the curved modular display 104-2 may be active and the reconfigurable buttons 202, 204, 206 and 208 of the curved modular display 104-1 may be deactivated.

In another implementation, the user may assign new functions to the reconfigurable buttons 202, 204, 206 and 208. For example, the reconfigurable buttons 202, 204, 206 and 208 of the curved modular display 104-1 may be set to be the power button, the menu button, the up navigation button and the down navigation button. Subsequently, the user may add the second curved modular display 104-2. Rather than deactivating the reconfigurable buttons 202, 204, 206 and 208 of one of the curved modular displays 104-1 or 104-2, the user may pre-define new functions for the reconfigurable buttons 202, 204, 206 and 208 of the second curved modular display 104-2. For example, the reconfigurable buttons 202, 204, 206 and 208 of the second curved modular display 104-2 may be set to be a contrast adjustment, a brightness adjustment, a color adjustment and an input selection, respectively.

As result, the respective displays areas 118 and 120 of the first curved modular display 104-1, the second curved modular display 104-2 and the center modular display 102 may appear as a single display to a computing device 310. It should be noted that a single connection 312 to the computing device 310 is used to operate the modular display system 300 despite being a combination of three separate modular displays comprising the first curved modular display 104-1, the second curved modular display 104-2 and the center modular display 102.

In one implementation, the first curved modular display 104-1 and the second curved modular display 104-2 are electrically connected to the center modular display 102 via the electrical connector 210 mated with a corresponding electrical receptacle 220 of the center modular display 102 (shown in phantom lines). The center modular display 102 may detect the electrical connection and modify an extended display identification data (EDID) file to correspond to the dimensions of the entire modular display system 300. The EDID file may be transmitted to the computing device 310 via the connection 312. The computing device 310 may then send video data that corresponds to the dimensions of the entire modular display system 300 to the center modular display 102. The center modular display 102 may transmit the video data to the first curved modular display 104-1 and the second curved modular display 104-2 via the respective electrical connectors 210. Processors within the first curved modular display 104-1, the second curved modular display 104-2 and the center modular display 102 (e.g., a scalar chip, a timing controller, and the like) can synchronize the video data and display the video data as a single continuous image across the respective displays 118 and 120 of the first curved modular display 104-1, the second curved modular display 104-2 and the center modular display 102.

It should be noted that the above is one example. In other implementations, the computing device 310 may be connected to the curved modular display 104-1 or 104-2. The computing device 310 may send video data to the connected curved modular display 104-1 or 104-2. The video data may then be sent to the center modular display 102 and the remaining curved modular display 104-1 or 104-2 via the respective electrical connectors 210.

In one implementation, a single stand 110 may be used to support the center modular display 102. The respective physical connections 212 of the first curved modular display 104-1 and the second curved modular display 104-2 may be connected to a corresponding physical connection 214 of the center modular display 102. In addition, the center modular display 102 may use an electrical connection 250 to a power outlet 252. Notably, the first curved modular display 104-1 and the second curved modular display 104-2 may not use a separate electrical connection the power outlet 252. Rather, the first curved modular display 104-1, and the second curved modular display 104-2 may be powered by the center modular display 102 via the respective electrical connectors 210. However, in other implementations, the power or data connections to the power outlet 252 may be to one of the curved modular displays 104-1 or 104-2.

Figure 4:
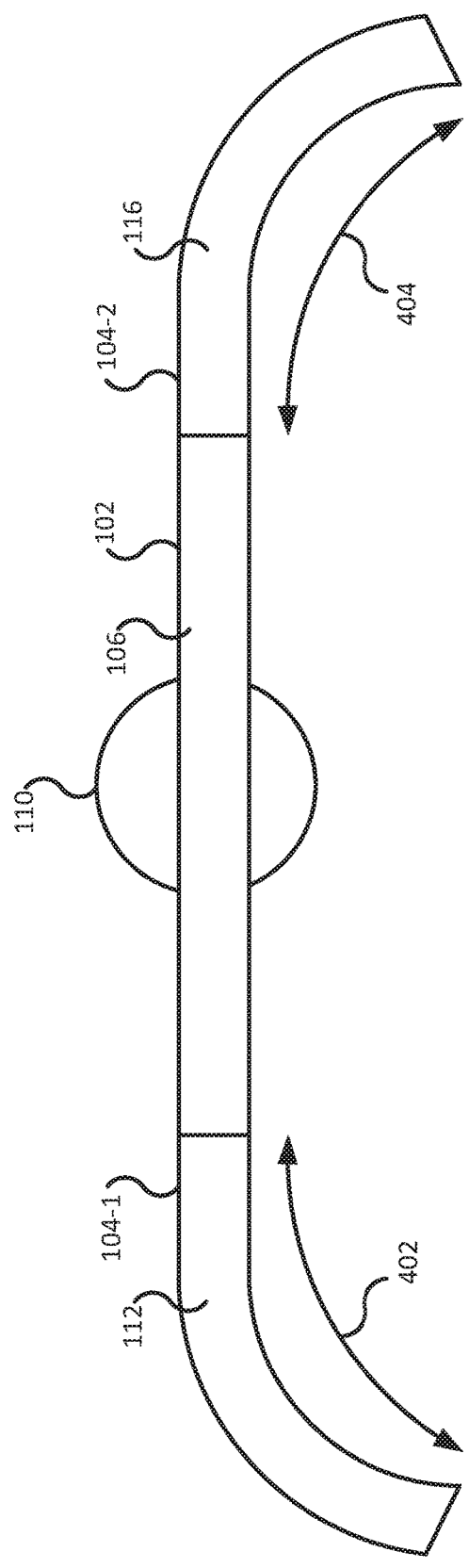
FIG. 4 is a block diagram of a top view of an example modular display system of the present disclosure.

FIG. 4 illustrates a top view of the example modular display system 300. The top view helps to illustrate a curvature 402 of the first curved modular display 104-1 and a curvature 404 of the second curved modular display 104-2. It should be noted that due to the modular design of the curved modular displays 104-1 and 104-2, a smaller substrate can be used to create a larger overall display area of the modular display system 300. With the smaller substrate of the curved modular displays 104-1 and 104-2, the amount of curvature 402 and 404 can be larger than a single substrate curved monitor.

In one example, the curvature 402 and the 404 may be the same or equal to one another. However, in another example, a variety of different curved modular displays 104 may be designed and sold having different amounts of curvature. This may provide more customization options for the user.

For example, based on the available workspace, a user may want to have more curvature on the left side of the modular display system 300 due to a corner of the desk, or wall. The user may want less curvature on the right side of the modular display system 300. As a result, in some implementations the curvature 402 may be different than the curvature 404.

FIG. 5 illustrates a block diagram of an example connection mechanism 502 of a modular display system 500. As noted above, either the center modular display 102 or the curved modular display 104 may receive direct power from a power outlet and be held by a stand. FIG. 5 illustrates one example, wherein the curved modular display 104-2 is directly connected to a power source (e.g., a wall outlet) 552 via a power connection 550. The curved modular displays 104-1 and 104-2 may be supported by a respective stand 110-1 and 110-2.

In one implementation, the physical connectors 212 of the curved modular displays 104-1 and 104-2 may be coupled to opposite ends 508 of the connection mechanism 502 (as shown in phantom lines being in the back). The center modular display 102-1 may also include a physical connector 214 that allows the center modular display 102-2 to be mounted onto the connection mechanism 502. In one example, the physical connector 214 may be a mechanical coupling such as a spring loaded clip, an interference fit, and the like. In another example, the connection mechanism 502 may have mounting holes (e.g., that correspond to spacing used for a VESA mount) and a fastener (e.g., a screw) may be used to secure the center modular display 102-2 to the connection mechanism 502.

In one implementation, the connection mechanism 502 may comprise a concentric sliding bar. For example, the connection mechanism 502 may include an outer guide 504 and an inner sliding bar 506. The inner sliding bar 506 may extend horizontally left or right as shown by an arrow 510. As a result, a user may increase the flat surface area using an additional center modular display 102-2.

For example, the modular display system 500 may initially look like the modular display system 300 illustrated in FIG. 3. At a later time, the user may desire a large display area or screen size. Thus, rather than having to purchase a larger monitor, the user may simply purchase another center modular display 102-2 at an incremental cost.

The curved modular display 104-1 may be disconnected from the center modular display 102-1. The connection mechanism 502 may be horizontally extended by sliding the inner sliding bar 506. The center modular display 102-2 may then be mounted onto the connection mechanism 502. The connection mechanism 502 may be pushed horizontally until the curved modular display 104-1, the center modular display 102-2 and the center modular display 102-1 are adjacent to one another. The center modular display 102-2 may be electrically connected to the curved modular display 104-1 and the center modular display 102-1. The modular display system 500 may perform a restart function to send a host device an updated EDID file with the new dimensions of the modular display system 500.

In another implementation, both the center modular display 102-1 and the center modular display 102-2 may be removed. As a result, the curved modular display 104-1 may be directly coupled to the curved modular display 104-2 without any center modular displays 102. Thus, a variety of different configurations may be achieved with the center modular display 102 and the curved modular display 104.

Thus, the examples of the present disclosure provide a fully modular display system that provides maximum customization for a user. For example, the screen size or display area can be increased or decreased. The amount of curvature of the display can be modified. A single curved modular display may be sold for both sides of the modular display system. Alternatively, a series of different curved modular displays having different amounts of curvature may be sold to allow a user to have different amounts of curvature on opposite sides of the modular display system.

The modular display system provides a clean look by allowing a single modular display to receive power and be connected to a host device. Thus, the design of the modular display system of the present disclosure avoids a clutter of wires running from the various modular displays to the host device and to a wall outlet for power.

Figure 6:
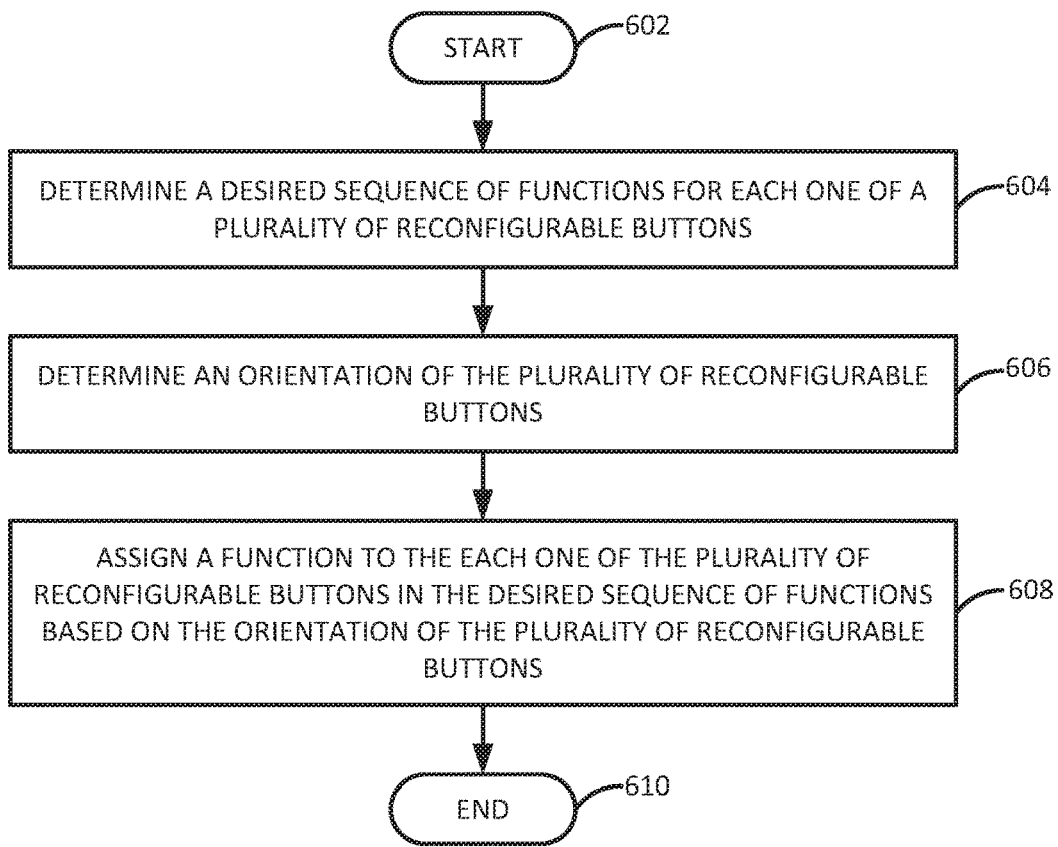
FIG. 6 is a block diagram of an example method for re-assigning functions of bezel buttons on a curved modular display.

FIG. 6 illustrates a flow diagram of an example method 600 for re-assigning functions of buttons on a curved modular display. In one example, the method 600 may be performed by the curved modular display 104. For example, the curved modular display 104 may include a processor and a non-transitory computer readable storage medium. The non-transitory computer readable storage medium may store instructions that when executed by the processor, cause the processor to perform the method 600.

At block 602, the method 600 begins. At block 604, the method 600 determines a desired sequence of functions for each one of a plurality of reconfigurable buttons. The buttons may be reconfigurable buttons that are physical bezel buttons or virtual buttons (e.g., defined touch areas on the bezel that are associated with a function). The desired sequence may be set by a manufacturer or may be selected by a user. The functions may include functions such as power, menu, navigation buttons (e.g., up, down, left, right), and the like.

At block 606, the method 600 determines an orientation of the plurality of reconfigurable buttons. In one example, the curved modular display may include an accelerometer that determines the orientation. In another example, the orientation may be determined by the electrical connection to the center modular display. For example, when the curved modular display is connected to a right side of the center modular display, the electrical connector of the center modular display may notify the curved modular display that it is in a right side orientation. When the curved modular display is connected to a left side of the center modular display, the electrical connector of the center modular display may notify the curved modular display that it is in a left side orientation.

At block 608, the method 600 assigns a function to the each one of the plurality of reconfigurable buttons in the desired sequence of functions based on the orientation of the plurality of reconfigurable buttons. For example, if the desired sequence of the reconfigurable buttons is power, menu, navigate up and navigate down, then the method 600 may assign the functions of the reconfigurable buttons in the desired sequence of power, menu, navigate up and navigate down.

In one example, the method 600 may continue to monitor an orientation of the curved modular display. When the curved modular display is rotated 180 degrees to be located on an opposite side, the blocks 606 and 608 may be repeated. For example, the functions of the reconfigurable buttons may be re-assigned again to the desired sequence of power, menu, navigate up and navigate down even though the order of the reconfigurable buttons has flipped. At block 610, the method 600 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A first modular display, comprising:
    a display area; and
    a first side that is capable of being bezel free, the first side including a physical connector to couple to a corresponding physical connector on a complementary bezel free side of a second modular display having a curved display area that is less than, or equal to, a display area of the first modular display, wherein the physical connector and the corresponding physical connector allows the second modular display to be coupled to the first modular display such that the first modular display and the second modular display appear as a single display to a computing device.

2. The first modular display of claim 1, further comprising:
    a second side that is capable of being bezel free, the second side including a second physical connector to couple to a corresponding physical connector on a complementary bezel free side of a third modular display having a curved display area that is less than, or equal to, a display area of the first modular display.

3. The first modular display of claim 2, wherein the first modular display, the second modular display, and the third modular display appear as the single display to the computing device.

4. The first modular display of claim 2, wherein the third modular display is identical to the second modular display, but rotated 180 degrees.

5. The first modular display of claim 2, wherein the second modular display and the third modular display are each coupled to a respective stand and the first modular display is coupled to the second modular display and the third modular display via a respective electrical connection.

6. The first modular display of claim 5, wherein the first modular display is powered by a power source of the second modular display and the third modular display via the respective electrical connection.

7. The first modular display of claim 1, wherein the first modular display is coupled to a stand and the second modular display is coupled to the first modular display via an electrical connection and the physical connector connected to the corresponding physical connector.

8. The first modular display of claim 7, wherein the second modular display is powered by a power source of the first modular display via the electrical connection.

9. The first modular display of claim 1, wherein the second modular display comprises reconfigurable buttons, wherein the reconfigurable buttons are reconfigured to have a same sequence of functions when the second modular display is rotated 180 degrees.

10. The first modular display of claim 1, wherein the physical connector is formed as a part of a back side of a housing of the first modular display and the corresponding physical connector is formed as a part of a back side of a housing of the second modular display.

11. A first modular display, comprising:
a display area;
a first side that is capable of being bezel free, the first side including a first physical connector to couple to a corresponding physical connector on a respective complementary bezel free side of a second modular display;
a second side that is opposite the first side and capable of being bezel free, the second side including a second physical connector to couple to a corresponding physical connector on a respective complementary bezel free side of a third modular display, wherein the second modular display and the third modular display comprise a curved display area that is less than, or equal to, a display area of the first modular display, wherein the first physical connector allows the second modular display to couple to the first modular display and the second physical connector allows the second modular display to be coupled to the first modular display such that the first modular display, the second modular display, and the third modular display appear as a single display to a computing device.

12. The first modular display of claim 11, wherein the third modular display is identical to the second modular display, but rotated 180 degrees.

13. The first modular display of claim 11, wherein the second modular display and the third modular display are each coupled to a respective stand and a respective power source and the first modular display is coupled to the second modular display via a first electrical connection and the third modular display via a second electrical connection.

14. The first modular display of claim 13, wherein the first physical connector and the second physical connector comprise a concentric sliding bar that extends horizontally to allow additional first modular displays to be added.

15. The first modular display of 13, wherein the first modular display is to perform a restart function when the additional first modular displays are added to send the computing device new dimensions of the first modular display, the additional first modular displays, the second modular display, and the third modular display.

16. The first modular display of claim 15, wherein the new dimensions are to be sent in an updated extended display identification data (EDID) file.

17. The first modular display of claim 11, wherein the second modular display and the third modular display comprise re-configurable buttons such that a sequence of functions of the re-configurable buttons is identical on the second modular display and the third modular display.

18. The first modular display of claim 11, wherein the first physical connector is formed as a part of a back side of a housing of the first modular display, the corresponding physical connector of the second modular display is formed as a part of a back side of a housing of the second modular display, and the corresponding physical connector of the third modular display is formed as a part of a back side of a housing of the third modular display.

19. A curved modular display, comprising:
a curved display area;
a bezel coupled to a first side, a second side, and a third side;
a plurality of reconfigurable buttons on the third side of the curved modular display;
a bezel free side opposite the third side of the curved modular display;
an electrical connector coupled to the bezel free side to connect with a corresponding electrical connector on a first side of a center modular display that is capable of being bezel free; and
a physical connector coupled to the bezel free side to physically connect with a corresponding physical connector on the first side of the center modular display.

20. The curved modular display of claim 19, wherein the plurality of reconfigurable buttons comprises physical buttons.

21. The curved modular display of claim 19, wherein the plurality of reconfigurable buttons comprise virtual buttons.

22. The curved modular display of claim 19, wherein the curved modular display is directly connected to a second curved modular display.

* * * * *